(12) United States Patent
Fischer

(10) Patent No.: US 6,796,596 B2
(45) Date of Patent: Sep. 28, 2004

(54) PASSENGER MOTOR VEHICLE AND FOLDING TOP THEREFOR

(75) Inventor: Thomas Fischer, Tuebingen (DE)

(73) Assignee: Dr. Ing. h.c.F. Porsche AG, Stuttgart (DE)

(*) Notice: Subject to any disclaimer, the term of this patent is extended or adjusted under 35 U.S.C. 154(b) by 0 days.

(21) Appl. No.: 10/417,348

(22) Filed: Apr. 17, 2003

(65) Prior Publication Data
US 2004/0021337 A1 Feb. 5, 2004

(30) Foreign Application Priority Data
Apr. 17, 2002 (DE) .......................................... 102 16 891

(51) Int. Cl.⁷ ................................................ B60J 7/12
(52) U.S. Cl. ................................... 296/107.12; 296/116
(58) Field of Search ........................... 296/107.12, 116

(56) References Cited

U.S. PATENT DOCUMENTS

| | | | |
|---|---|---|---|
| 5,002,330 A | | 3/1991 | Koppenstein et al. |
| 5,669,656 A | * | 9/1997 | Aydt et al. ................. 296/116 |
| 5,816,644 A | | 10/1998 | Rothe et al. |
| 5,829,821 A | | 11/1998 | Aydt et al. ................. 296/122 |
| 5,918,928 A | | 7/1999 | Kolb et al. ............ 296/107.04 |
| 6,325,446 B1 | * | 12/2001 | Wuellrich et al. ..... 296/107.12 |
| 6,328,372 B1 | | 12/2001 | Just ........................ 296/107.12 |
| 6,347,827 B1 | * | 2/2002 | Maass .................... 296/107.09 |
| 6,409,247 B1 | * | 6/2002 | Maass .................... 296/107.13 |
| 6,499,793 B2 | * | 12/2002 | Heselhaus et al. ..... 296/107.14 |

FOREIGN PATENT DOCUMENTS

| | | |
|---|---|---|
| DE | 3907227 | 5/1990 |
| DE | 4441666 | 12/1995 |
| DE | 44 41 666 | 12/1995 |
| DE | 19616255 | 5/1997 |
| DE | 19636209 | 12/1997 |
| DE | 19912358 | 9/2000 |
| DE | 19957012 | 6/2001 |
| EP | 0749859 | 12/1996 |

* cited by examiner

Primary Examiner—Stephen Gordon
(74) Attorney, Agent, or Firm—Crowell & Moring LLP

(57) ABSTRACT

A convertible contains a folding top comprising a folding top frame structure, which is pivotably connected to the motor vehicle, with a rear tensioning bar and a folding top cover that is held in position on the folding top frame structure. The tensioning bar can be displaced about a substantially horizontal swivel axis into a roughly horizontal tensioned position and a roughly upright mounted position. In order to keep the tensioning bar securely in the mounted position a fastening strap is provided, which engages with the tensioning bar that is displaced in the mounted position, and which can be attached to the folding top or the motor vehicle and thus keeps the tensioning bar in the mounted position.

16 Claims, 3 Drawing Sheets

PASSENGER MOTOR VEHICLE AND FOLDING TOP THEREFOR

BACKGROUND AND SUMMARY OF THE INVENTION

This application claims the priority of German Application No. 102 16 891.1 filed Apr. 17, 2002, the disclosure of which is expressly incorporated by reference herein.

The invention is based on a motor vehicle with a folding top. Preferred embodiments of the invention relate to a motor vehicle with a folding top comprising a folding top frame structure which is pivotably connected to the motor vehicle, with a rear tensioning bar and a folding top cover that is held in position on the folding top frame structure, wherein the tensioning bar can be displaced about a substantially horizontal swivel axis into a roughly horizontal tensioned position and a roughly upright mounted position.

A motor vehicle of the above-mentioned type is known from German Patent Document DE 44 41 666 C1. It includes a folding top, which contains a folding top structure that is attached to the vehicle in a pivoting manner and contains among other things a rear-tensioning bar. Furthermore, the collapsible roof comprises a folding top covering that is held in position on the folding top structure. In the closed state, the top spans the passenger compartment. To accomplish this, the tensioning bar assumes a substantially horizontal tensioning position to offer sufficient tension for the folding top material. Especially in the case of a motor vehicle with a central motor configuration, access to the engine compartment that is located beneath the tensioning bar can be difficult when the folding top is closed. In order to facilitate access, in the familiar vehicle the tensioning bar can be folded about a substantially horizontal swivel axis into roughly a vertical mounted position.

It is an object of the invention to improve the mounted position of the tensioning bar in a vehicle of the generic kind.

This object is achieved by providing a motor vehicle with a folding top comprising a folding top frame structure, which is pivotably connected to the motor vehicle, with a rear tensioning bar and a folding top cover that is held in position on the folding top frame structure, wherein the tensioning bar can be displaced about a substantially horizontal swivel axis into a roughly horizontal tensioned position and a roughly upright mounted position, characterized by a fastening strap, which connects with the tensioning bar that is displaced in the mounted position and can be attached to the folding top or the motor vehicle and thus keeps the tensioning bar in the mounted position.

Other advantageous features of preferred embodiments of the invention are described herein and in the claims.

Important advantages accomplished with the invention are that in the mounted position the tensioning bar can be secured against undesirable backward folding, simplifying maintenance work on the vehicle and/or making repairs convenient and possibly enabling work on the folding top. Additionally, the tensioning bar can be secured in the preferably upright mounted position through very simple and therefore inexpensive means. Modifications to the folding top frame structure are not required. The invented fastening strap can, of course, be used not only for a folding top in a vehicle with central motor, but the tensioning bar, which can be displaced in the mounted position, offers easy access to the remaining, for example interior, parts of the folding top when the collapsible roof is closed. The fastening strap can also be used for a folding top in a vehicle with front or rear motor.

In a design according to certain preferred embodiments of the invention, the fastening strap is attached with its first end to the vehicle beneath the tensioning bar. In the mounted state of the tensioning bar, the fastening strap is guided around the tensioning bar and holds it in the mounted position, which can also be described as a service position.

In a design according to certain preferred embodiments of the invention, the first end of the fastening strap can be attached to a folding top bearing console, to which furthermore the folding top frame structure is pivotably connected. Alternatively, according to certain preferred embodiments of the invention, the first end of the fastening strap can be attached directly to the tensioning bar.

In an additional development of the invention according to certain preferred embodiments of the invention, the second end of the fastening strap includes a fastening device, preferably in the form of a loop or ring, so that said second end can be attached to the folding top or the vehicle by being passed through said device for the purpose of securing the tensioning bar in the mounted position. The loop or ring can for example be attached to the latch hook or a centering pin, wherein said latch hook or centering pin is arranged on the front end of the folding top and interacts with the windshield frame.

So as not to influence the function of the folding top, i.e. opening and closing, in a design according to certain preferred embodiments of the invention, the fastening strap is held detachably on the tensioning bar in the rest position. This can be accomplished for example with the Velcro strap according to certain preferred embodiments of the invention, which is arranged on the tensioning bar and/or on the fastening strap itself. The fastening strap can thus be used any number of times and can be safely stored in the rest position. The fastening strap according to certain preferred embodiments of the invention, for example, is held detachably in position particularly along the tensioning bar.

The length of the fastening strap is selected in accordance with the position of a fastening spot that is arranged on the folding top or the vehicle. If the fastening strap is supposed to be attached to the above-mentioned centering element or the latch hook, the length of the fastening strap shall be dimensioned such that it reaches to the front folding top end.

Other objects, advantages and novel features of the present invention will become apparent from the following detailed description of the invention when considered in conjunction with the accompanying drawings.

DETAILED DESCRIPTION OF THE DRAWINGS

Figure 1:
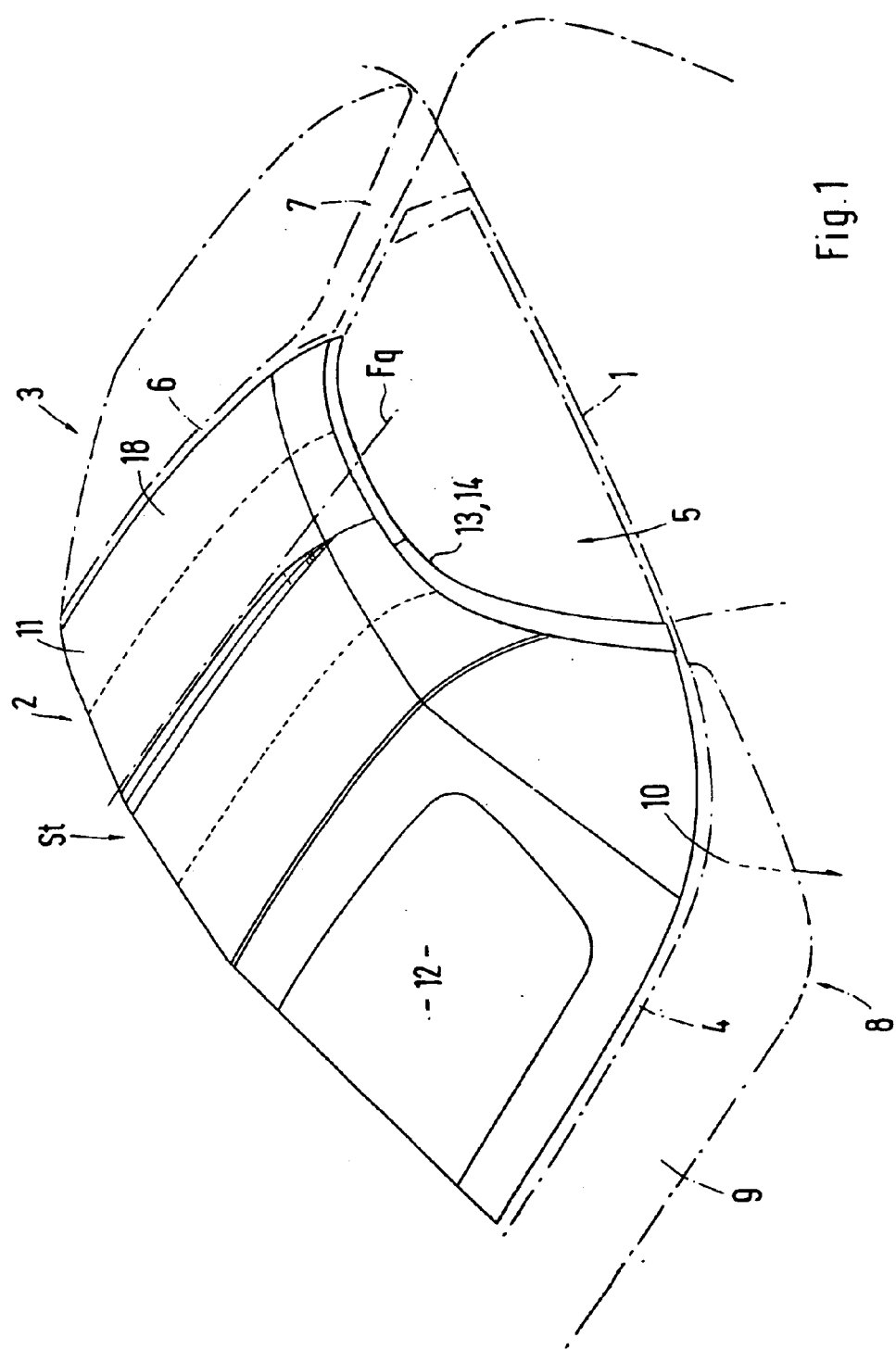
FIG. 1 is a schematic partial perspective view of a motor vehicle with a folding top constructed according to certain preferred embodiments of the invention.

FIG. 1 shows above a belt line 1 of a vehicle body a folding top 2 for a motor vehicle 3, which is designed symmetrical to the vehicle's central longitudinal plane. FIG. 1 reflects the closed position St of the folding top 2, in which it spans from a rear area 4 across a passenger compartment 5 to the front transverse frame section 6 of a windshield frame 7. In the open position, the folding top 2 can be stored in a storage compartment 8 in the rear, which is covered and released upward by a displaceable folding top box lid 9. Apart from the folding top cover 11, in which a possibly rigid rear window 12 is arranged, FIG. 1 depicts of the folding top 2 also a lateral roof frame 13 of a folding top frame structure 14, which holds the folding top cover 11 in place. The motor vehicle 3 is in particular a two-seat passenger vehicle with central motor arrangement where the drive assembly is located directly behind the passenger compartment 5 and is arranged for example beneath the folding top box 8 in an engine compartment 10.

The folding top frame structure 14 is pivotably connected to the motor vehicle 3, especially its body, on a folding top bearing console 15. The folding top frame structure 14 comprises several link rods 16, 17, which can form a four-bar mechanism that is pivotably connected on one hand to the folding top bearing console 15 or the remaining components of the folding top frame structure and on the other hand to a dimensionally stable roof section 18. The folding top frame structure 14 also contains a transverse hoop 19, for example a main hoop, which is connected in a swivel axis 20 with the folding top bearing console 15. Apart from other levers or link rods, which are not described in more detail here, the folding top frame structure 14 comprises also a rear tensioning bar 21, which is held displaceably about a substantially horizontal swivel axis 22 that runs roughly parallel and spaced to the vehicle's lateral axis Fq. The tensioning bar 21 particularly has a U-shape and therefore comprises a tensioning bar base 23 as well as tensioning bar legs extending therefrom, of which however only one leg 24 is shown. The swivel axis 22 is located on the leg ends.

Figure 2:
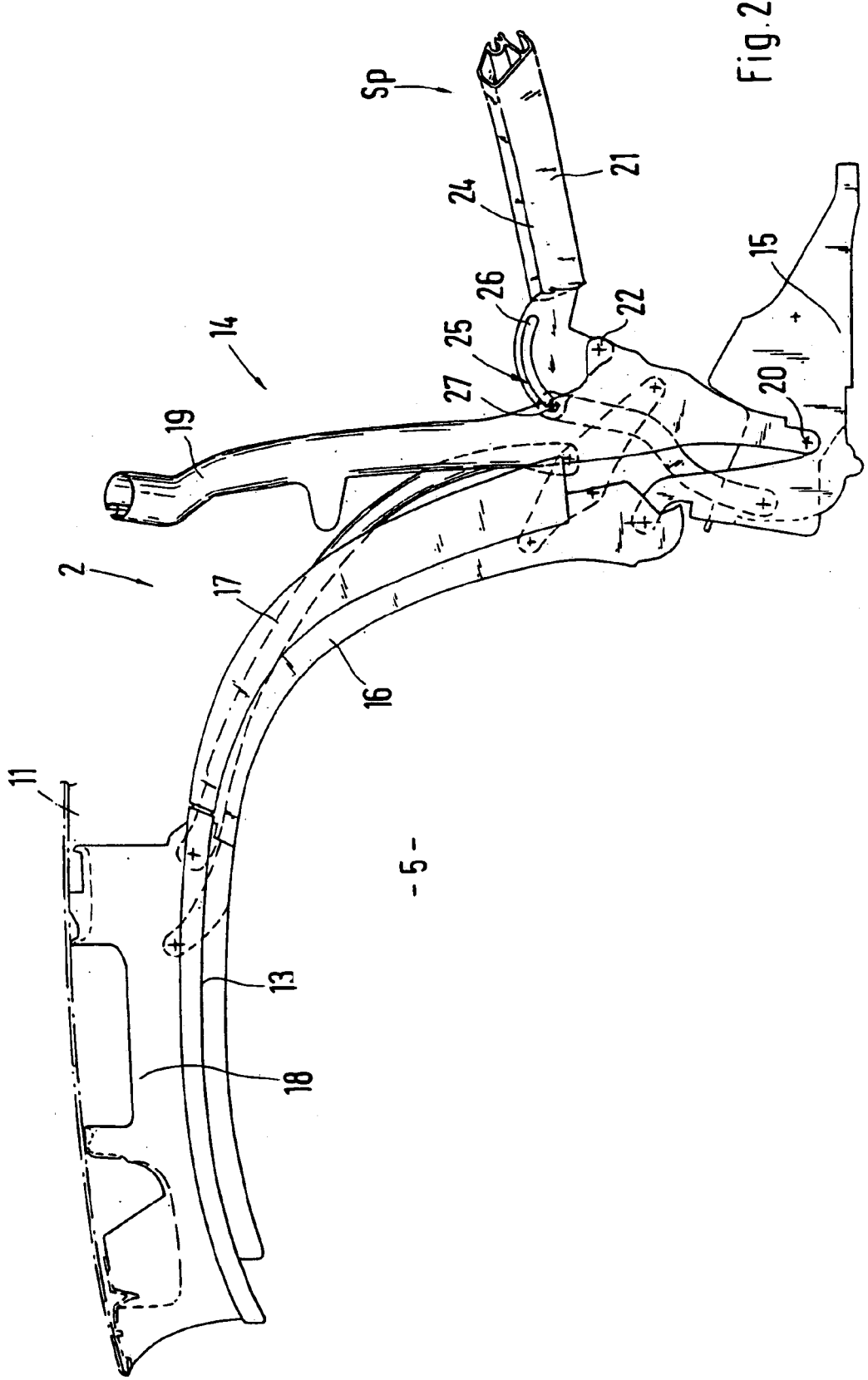
FIG. 2 is a partial perspective view which shows the folding top frame structure for the top of FIG. 1 with a tensioning bar in a tensioned state.
Figures 3, 4:
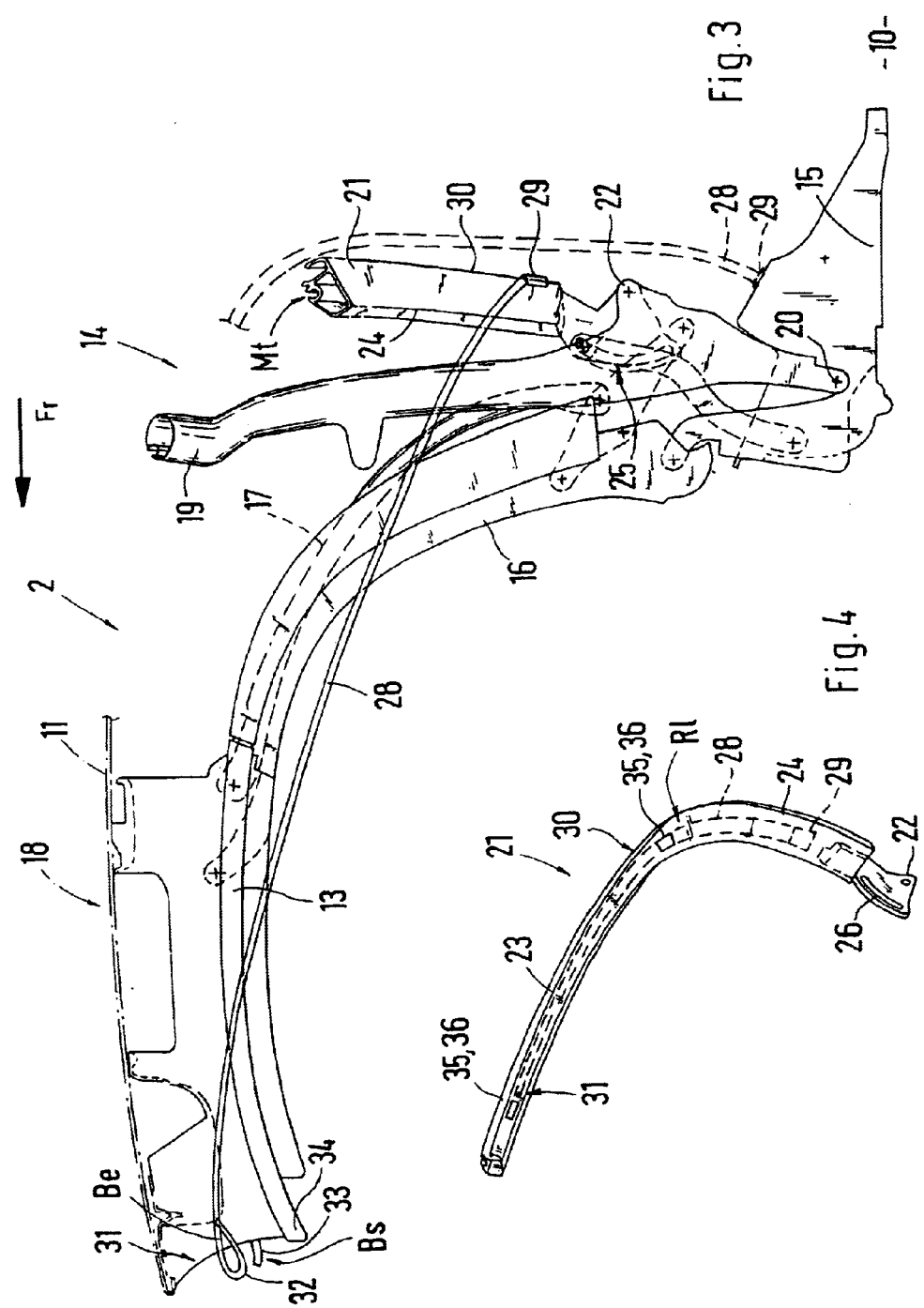
FIG. 3 shows the folding top frame structure pursuant to FIG. 2 with a tensioning bar that is held in the mounted state.
FIG. 4 is a sectional view of a tensioning bar constructed according to certain preferred embodiments of the invention in a diagrammatic view.

The tensioning bar 21 can be displaced from its tensioned position Sp shown in FIG. 2, in which it is substantially horizontal and stretches the folding top cover 11, into its mounted position Mt reflected in FIG. 3. The mounted position Mt of the tensioning bar 21 is located above the tensioned position Sp. Starting from the tensioned position Sp, the tensioning bar 21 is folded about its swivel axis 22 against the driving direction Fr upward for example into the upright mounted position Mt. Hereby it is guided by a control device 25, which comprises an arched guideway 26 and a guide pin 27, which engages with the guideway 26.

A fastening strap 28, which in one design is attached with its first end 29 to the tensioning bar 21, particularly its bottom 30, is provided for keeping the tensioning bar 21 in its mounted position Mt. With its second end 31, the fastening strap is attached to a fastening spot Bs on the folding top 2 or on the motor vehicle 3 with a fastening device Be that is arranged on the second end 31, wherein the fastening spot Bs is located above the swivel axis 22. The length of the fastening strap 28 is adjusted in particular to the position assumed by the fastening spot Bs on the folding top 2 or the motor vehicle 3 with regard to the first end 29. The length of the fastening strap 28 can also be adjustable. In the presented design the fastening strap 28 contains on its second end 31 a loop or ring 32 as the fastening device Be, with which it can be latched onto a centering pin 33, which forms the fastening spot Bs. The centering pin 33 is provided on the front folding top end 34 and in the closed position St interacts with the transverse frame part 6 of the windshield frame for centering of the folding top.

Based on another design, the first end 29 of the fastening strap 28 can be attached to the motor vehicle 3, especially to the folding top bearing console 15 or possibly also to the folding top frame structure 14, as is indicated with dotted lines in FIG. 3. The fastening point for the first end 29 is located beneath the tensioning bar 21 or beneath the swivel axis 22. In the mounted position Mt, the fastening strap 28 is hereby guided around the outside of the tensioning bar 28 and can be latched with its ring 32 on the centering pin.

Independent of the selected fastening point of the first end 29, the fastening strap 28 connects with the tensioning bar 21 by being attached directly to the tensioning bar 21, for example with its first end 29, or by being guided around the tensioning bar 21. Additionally, the fastening strap 28 is attached to the vehicle or folding top 2 with its second end 31, for example it is latched, so that the tensioning bar 21 is held in the mounted position Mt. Pursuant to FIG. 4, in its rest position RI the fastening strap 28 is held in position on the bottom 30 along the arched shape of the tensioning bar 21 so that it does not interfere with the folding top frame structure 14 when opening and closing the collapsible roof 2. For the purpose of localizing the fastening strap 28 in the rest position Rl at least one detachable fastening device 35 can be provided, which is designed for example as a VELCRO (e.g., hook-and-loop type) strap 36. On the VELCRO strap the fastening strap 28, which consists especially of material fibers, can be localized. On the bottom 30 several fastening devices 35 can be distributed across the length of the tensioning bar 21 in order to keep the fastening strap 28 against the arched tensioning bar 21.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle with a folding top comprising a folding top frame structure which is pivotably connected to the motor vehicle, with a rear tensioning bar and a folding top cover that is held in position on the folding top frame structure, wherein the tensioning bar can be displaced about a substantially horizontal swivel axis into a roughly horizontal tensioned position and a roughly upright mounted position, wherein a fastening strap is provided which connects with the tensioning bar that is displaced in the mounted position and can be attached to the folding top or the motor vehicle and thus keeps the tensioning bar in the mounted position, wherein the fastening strap is held detachably against the tensioning bar in a rest position, and wherein the fastening strap is held against the tensioning bar by means of a hook-and-loop type strap.

2. Motor vehicle pursuant to claim 1, wherein the fastening strap is attached with a first end to the motor vehicle beneath the tensioning bar.

3. Motor vehicle pursuant to claim 2, wherein the fastening strap is attached with the first end to a folding top bearing console.

4. Motor vehicle pursuant to claim 1, wherein the fastening strap is attached with a first end to the tensioning bar.

5. Motor vehicle pursuant to claim 2, wherein a second end of the fastening strap comprises a fastening device.

6. Motor vehicle pursuant to claim 3, wherein a second end of the fastening strap comprises a fastening device.

7. Motor vehicle pursuant to claim 4, wherein a second end of the fastening strap comprises a fastening device.

8. Motor vehicle pursuant to claim 1, wherein the tensioning bar is arch-shaped, and the fastening strap is held detachably in position along the arched tensioning bar in the rest position.

9. Motor vehicle pursuant to claim 1, wherein the motor vehicle and/or the folding top comprises a fastening spot, to which the fastening strap can be attached.

10. A folding top frame structure for a convertible passenger vehicle, comprising:

a rear tensioning bar operable to tension a top cover on the folding frame structure when in an approximately horizontal tensioned position, said rear tensioning bar being displaceable about a substantially horizontal swivel axis between said tensioned position and an upright mounted position, and a fastening strap selectably connected in use between the tensioning bar and adjacent structure of one of said vehicle and said top frame structure and operable to hold the tensioning bar in said mounted position, wherein the fastening strap is held detachably against the tensioning bar in a rest position, and wherein the fastening strap is held against the tensioning bar by means of a hook-and-loop type strap.

11. A folding top frame structure according to claim 10, wherein the fastening strap is attached with a first end to the motor vehicle beneath the tensioning bar.

12. A folding top frame structure according to claim 11, wherein the fastening strap is attached with the first end to a folding top bearing console.

13. A folding top frame structure according to claim 10, wherein the fastening strap is attached with a first end to the tensioning bar.

14. A folding top frame structure according to claim 13, wherein a second end of the fastening strap comprises a fastening device.

15. A folding top frame structure according to claim 10, wherein the tensioning bar is arch-shaped, and the fastening strap is held detachably in position along the arched tensioning bar in the rest position.

16. A folding top frame structure according to claim 10, wherein the motor vehicle and/or the folding top top frame structure comprises a fastening spot, to which the fastening strap can be attached.

* * * * *